United States Patent
Fang et al.

(10) Patent No.: US 9,255,169 B2
(45) Date of Patent: Feb. 9, 2016

(54) METHOD FOR PREPARING BIOMASS-BASED POLYMER EMULSION

(71) Applicant: Zhongying Changjiang International New Energy Investment Co., Ltd., Wuhan (CN)

(72) Inventors: Zhangjian Fang, Wuhan (CN); Xingcai Zheng, Wuhan (CN); Yuting Cheng, Wuhan (CN); Zhijiu Zhuo, Wuhan (CN)

(73) Assignee: Zhongying Changjiang International New Energy Investment Co., Ltd., Wuhan (CN)

( * ) Notice: Subject to any disclaimer, the term of this patent is extended or adjusted under 35 U.S.C. 154(b) by 0 days.

(21) Appl. No.: 14/749,629

(22) Filed: Jun. 24, 2015

(65) Prior Publication Data
US 2015/0291720 A1     Oct. 15, 2015

Related U.S. Application Data

(63) Continuation-in-part of application No. PCT/CN2013/088594, filed on Dec. 5, 2013.

(30) Foreign Application Priority Data

Dec. 25, 2012 (CN) .......................... 2012 1 0572455

(51) Int. Cl.
*C08F 283/00* (2006.01)
*C08G 18/00* (2006.01)
*D06M 15/00* (2006.01)
*C08G 18/72* (2006.01)
*C08G 18/75* (2006.01)
*C08G 18/12* (2006.01)
*C08G 18/67* (2006.01)
*C08L 51/08* (2006.01)

(52) U.S. Cl.
CPC ............ *C08F 283/008* (2013.01); *C08G 18/12* (2013.01); *C08G 18/677* (2013.01); *C08G 18/6765* (2013.01); *C08G 18/72* (2013.01); *C08G 18/751* (2013.01); *C08L 51/08* (2013.01); *C08L 2201/52* (2013.01)

(58) Field of Classification Search
CPC .. C08F 282/008; C08G 18/72; C08G 18/751; C08G 18/12; C08G 18/677; C08G 18/6765
USPC .................................................. 524/811, 310
See application file for complete search history.

(56) References Cited

U.S. PATENT DOCUMENTS

2012/0129963 A1*   5/2012   Benedetti .............. C07C 37/115
                                                     521/97

* cited by examiner

*Primary Examiner* — Kelechi Egwim
(74) *Attorney, Agent, or Firm* — Matthias Scholl P.C.; Matthias Scholl

(57) ABSTRACT

A method for preparing biomass-based polymer emulsion. The method includes: 1) preparing cardanol-based polymerizable emulsifier; 2) preparing castor oil-based polyurethane prepolymer; and 3) preparing biomass-based polymer emulsion.

1 Claim, 1 Drawing Sheet

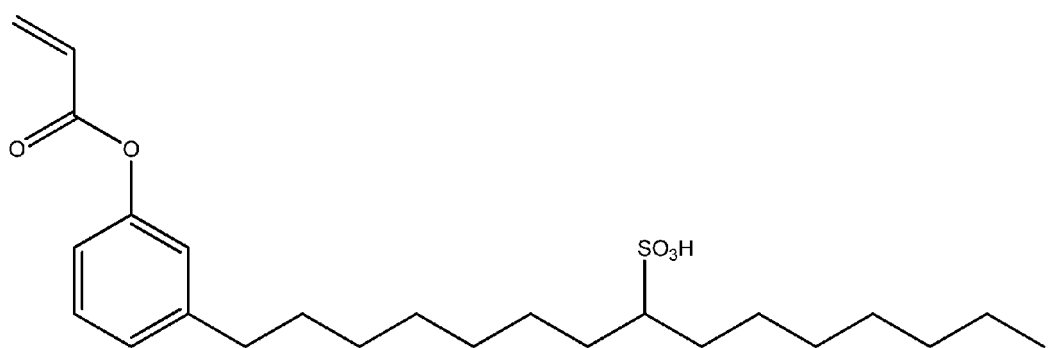

METHOD FOR PREPARING BIOMASS-BASED POLYMER EMULSION

CROSS-REFERENCE TO RELATED APPLICATIONS

This application is a continuation-in-part of International Patent Application No. PCT/CN2013/088594 with an international filing date of Dec. 5, 2013, designating the United States, now pending, and further claims priority benefits to Chinese Patent Application No. 201210572455.1 filed Dec. 25, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a method for preparing biomass-based polymer emulsion.

2. Description of the Related Art

Employing castor oil to prepare waterborne polyurethane can enhance the inner crosslinking and improve the properties of the waterborne polyurethane. However, typical castor oil-modified waterborne polyurethane has large particle size, poor film-forming property, low film hardness, and poor water resistance, and tends to deposit after long storage.

SUMMARY OF THE INVENTION

In view of the above-described problems, it is one objective of the invention to provide a method for preparing biomass-based polymer emulsion that has simple process and low cost, and the resulting product has good stability and film-forming properties, can be used for preparation of adhesives, coating material, finishing agents, and the like.

To achieve the above objective, in accordance with one embodiment of the invention, there is provided a method for preparing biomass-based polymer emulsion, the method comprising:

1) Preparation of Cardanol-Based Polymerizable Emulsifier

Based on mole mass ratio, vacuum dehydrating one part of cardanol for between 1 and 3 hours to be anhydrous, dissolving the cardanol in between 10 and 100 parts of a solvent a, followed by addition of between 0.8 and 1.2 part of a sulphonating agent and between 0.8 and 1.2 part of a strong base; allowing a resulting mixture to react at a temperature of between 70 and 150° C. for between 2 and 6 hours, cooling the mixture to room temperature, adjusting a pH value thereof using chlorhydric acid to between 1 and 5, allowing to react at a temperature of between 70 and 150° C. for between 1 and 3 hours, cooling to room temperature, allowing to stand overnight, filtering, washing using between 10 and 100 parts of the solvent a at a temperature of between 0 and 5° C. to yield a white solid, drying and dissolving the white solid in between 10 and 100 parts of an anhydrous solvent b, followed by addition of between 0.8 and 1.5 part of a modifier and between 0.8 and 1.5 part of triethylamine, allowing a resulting solution to react at a temperature of between 0 and 5° C. for between 0.5 and 24 hours, to yield a cardanol-based polymerizable emulsifier.

The strong base is potassium hydroxide and/or sodium hydroxide.

The solvent a is water, alcohol, methanol, tetrahydrofuran, acetone, dioxane, acetonitrile, dimethylformamide, dimethyl sulfoxide, or a mixture thereof.

The solvent b is dichloromethane, tetrahydrofuran, acetonitrile, or a mixture thereof.

The modifier is acryloyl chloride, methacryloyl chloride, allyl chloride, or a mixture thereof.

The sulphonating agent is $Na_2S_2O_5$, $Na_2SO_3$ and/or $NaHSO_3$.

2) Preparation of Castor Oil-Based Polyurethane Prepolymer

Based on mole mass ratio, providing one part of dried castor oil with a temperature of between 0 and 20° C., adding dropwise to the castor oil 10-30 wt. % of acetone dissolved maleic anhydride in 5-30 min, heating a resulting mixture to a temperature of between 25 and 50° C. and allowing to react for between 0.5 and 24 hours, and then continuing heating the mixture to a temperature of between 60 and 80° C. and allowing to react for between 4 and 5 hours, removing a solvent at a temperature of between 30 and 40° C. under vacuum, cooling the mixture to room temperature, to yield a red-orange maleic anhydride modified castor oil.

Based on mole mass ratio, heating the maleic anhydride modified castor oil to 60° C., followed by addition dropwise of between 1.0 and 2.5 parts of an isocyanate, between 0.1 and 1 part of a catalyst, and between 0.1 and 1 part of a chain extendor, allowing to react for between 1 and 6 hours, to yield a viscous polymerizable castor oil-based polyurethane prepolymer.

The isocyanate is 1,6-diisocyaate, 1,6-diisocyanate or isophorone diisocyanate.

The catalyst is N,N,N',N'-Tetramethyl-1,4-diaminobutane, triethylenediamine, dibutyltin dilaurate or stannous octoate.

The chain extendor is ethylenediamine, diethylenetriamine, hexamethylene diamine, isophoronediamine, p-phenylenediamine, or a mixture thereof.

3) Preparation of Biomass-Based Polymer Emulsion

Based on mole mass ratio, mixing one part of the castor oil-based polyurethane prepolymer obtained in 2), between 0.05 and 0.2 part of the cardanol-based polymerizable emulsifier obtained in 1), between 2 and 20 parts of an acrylate monomer, and between 100 and 200 parts of water, allowing a resulting solution to swell at a temperature of between 50 and 60° C. for between 0.5 and 2 hours, heating the solution to a temperature of between 70 and 90° C., adding dropwise to the solution an aqueous solution comprising between 0.001 and 0.1 part of an initiator, and allowing the solution to react for between 2 and 4 hours, to yield biomass-based polymer emulsion.

The acrylate monomer is methylmethacrylate or butyl acrylate.

The initiator is potassium persulfate and/or ammonium persulfate.

In this invention, in the presence of cardanol-based polymerizable emulsifier, acrylates undergo copolymerization, specifically, the graft copolymerization occurs on the double bonds of the castor oil derivatives to produce a stable emulsion. The emulsion can be used for preparation of adhesives, coating material, finishing agents, and the like.

Advantages of the method for preparing biomass-based polymer emulsion according to embodiments of the invention are summarized as follows.

1. Cardanol and castor oil are widely available biomass resources, with low production cost, thereby reducing the dependence on oil resources. The invention combines the advantages of castor oil and acrylate emulsion, which further enhance the overall properties of polyurethane emulsion.

2. The esterified castor oil has low hydroxyl functionality and can be used for preparation of polyurethane polymers with appropriate molecular weight and filling function. The long aliphatic hydrocarbon carbon chains of the castor oil can effectively enhance the softness of the polymer, and aliphatic diisocyanate has good weathering resistance.

3. The emulsion is prepared following the method for preparation of soap-free emulsion, where polymerizable anionic emulsifier and reactive emulsifier are involved, thereby improving the stability, water resistance, chemical resistance, and weathering resistance of the polymer emulsion.

The biomass-based polymer emulsion prepared in the invention has high compatibility, good stability, water resistance, chemical resistance, and weathering resistance, and it is non-combustible, innoxious, and eco-friendly, can be used for preparation of adhesives, coating material, finishing agents, and the like, with broad applications.

BRIEF DESCRIPTION OF THE DRAWINGS

The invention is described hereinbelow with reference to accompanying drawings, in which the sole FIGURE is a chemical formula of a biomass-based polymer emulsion obtained in Example 2.

DETAILED DESCRIPTION OF THE EMBODIMENTS

In this invention, in the presence of cardanol-based polymerizable emulsifier, acrylates undergo copolymerization, specifically, the graft copolymerization occurs on the double bonds of the castor oil derivatives. The resulting emulsion can be used for preparation of adhesives, coating material, finishing agents, and the like.

For further illustrating the invention, experiments detailing a method for preparing biomass-based polymer emulsion are described below. It should be noted that the following examples are intended to describe and not to limit the invention.

Example 1

1) Preparation of Cardanol-Based Polymerizable Emulsifier 3 g of cardanol purchased from the market was completely dehydrated under vacuum for an hour, and dissolved in 20 mL of a mixed solvent of tetrahydrofuran and water with a volume ratio thereof of 1:1 at room temperature, followed by addition of 2 g of $Na_2S_2O_5$ and 0.4 g of sodium hydroxide. The resulting mixture was allowed to react at 80° C. for 6 hours, and then cooled to room temperature. Thereafter, the pH value of the mixture was adjusted using chlorhydric acid to 5, and then the mixture was allowed to react at 150° C. for 3 hours. After the reaction, the mixture was cooled to room temperature, allowed to stand overnight, filtered, and washed with 10 mL of tetrahydrofuran (5° C.) to yield a white solid, which was dried, and dissolved in 10 mL of anhydrous dichloromethane, and followed by addition of 1 g of acryloyl chloride and 1.1 g of triethylamine. The solution was allowed to react at 5° C. for 0.5 hour, to yield a cardanol-based polymerizable emulsifier, with a yield of 80%.

2) Preparation of Castor Oil-Based Polyurethane Prepolymer

To a dried four-mouthed flask equipped with a thermometer, agitator, and reflux condenser, 9.32 g of dried castor oil and 10 mL of acetone were added and the temperature thereof was controlled at 20° C. Thereafter, 10 mL of 30 wt. % of acetone dissolved maleic anhydride was added dropwise in 30 min. The mixture was heated to 35° C. and allowed to react for 24 hours, and then was further heated to 80° C. and allowed to react for 5 hours. The added solvent was removed under vacuum at 40° C., and the mixture was cooled to room temperature to yield a red-orange maleic anhydride modified castor oil.

10.32 g of the maleic anhydride modified castor oil was heated to 60° C., followed by addition dropwise of 2.22 g of isophorone diisocyanate, 0.4 g of stannous octoate as a catalyst, and 0.056 g of ethylenediamine as a chain extendor. The resulting mixture was allowed to react for an hour, to yield a viscous polymerizable castor oil-based polyurethane prepolymer.

3) Preparation of Biomass-Based Polymer Emulsion 14.7 g of the castor oil-based polyurethane prepolymer obtained in 2), 0.22 g of the cardanol-based polymerizable emulsifier obtained in 1), 0.2 g of butyl acrylate, and 18 mL of water was mixed and swollen at 60° C. for 2 hours. The mixture was heated to 90° C., and then 1 g of an aqueous solution comprising 0.02 g of potassium persulfate was added. Thereafter, the mixture was added to react for 4 hours, to yield biomass-based polymer emulsion.

Example 2

1) Preparation of Cardanol-Based Polymerizable Emulsifier 3 g of cardanol purchased from the market was completely dehydrated under vacuum for an hour, and dissolved in 20 mL of a mixed solvent of tetrahydrofuran and water with a volume ratio thereof of 1:1 at room temperature, followed by addition of 1.8 g of $Na_2SO_3$ and 0.6 g of sodium hydroxide. The resulting mixture was allowed to react at 80° C. for 6 hours, and then cooled to room temperature. Thereafter, the pH value of the mixture was adjusted using chlorhydric acid to 5, and then the mixture was allowed to react at 150° C. for 3 hours. After the reaction, the mixture was cooled to room temperature, allowed to stand overnight, filtered, and washed with 10 mL of methonal (0° C.) to yield a white solid, which was dried, and dissolved in 10 mL of anhydrous acetonitrile, and followed by addition of 1.1 g of acryloyl chloride and 1.0 g of triethylamine. The solution was allowed to react at 5° C. for 24 hours, to yield a cardanol-based polymerizable emulsifier, with a yield of 80%.

2) Preparation of Castor Oil-Based Polyurethane Prepolymer

To a dried four-mouthed flask equipped with a thermometer, agitator, and reflux condenser, 9.32 g of dried castor oil and 10 mL of acetone were added and the temperature thereof was controlled at 0° C. Thereafter, 30 mL of 10 wt. % of acetone dissolved maleic anhydride was added dropwise in 20 min. The mixture was heated to 50° C. and allowed to react for 12 hour, and then was further heated to 70° C. and allowed to react for 4 hours. The added solvent was removed under vacuum at 30° C., and the mixture was cooled to room temperature to yield a red-orange maleic anhydride modified castor oil.

10.32 g of the maleic anhydride modified castor oil was heated to 60° C., followed by addition dropwise of 2.22 g of isophorone diisocyanate, 0.4 g of stannous octoate as a catalyst, and 0.11 g of p-phenylenediamine as a chain extendor. The resulting mixture was allowed to react for 6 hours, to yield a viscous polymerizable castor oil-based polyurethane prepolymer.

3) Preparation of Biomass-Based Polymer Emulsion 14.7 g of the castor oil-based polyurethane prepolymer obtained in 2), 0.88 g of the cardanol-based polymerizable emulsifier obtained in 1), 0.5 g of methylmethacrylate, and 24 mL of water was mixed and swollen at 50° C. for 2 hours. The mixture was heated to 90° C., and then 1 g of an aqueous solution comprising 0.02 g of ammonium persulfate was added. Thereafter, the mixture was added to react for 4 hours, to yield biomass-based polymer emulsion as shown in the drawing.

Example 3

1) Preparation of Cardanol-Based Polymerizable Emulsifier 3 g of cardanol purchased from the market was completely dehydrated under vacuum for 2 hours, and dissolved in 20 mL of a mixed solvent of alcohol and water with a volume ratio thereof of 1:1 at room temperature, followed by addition of 3.0 g of $Na_2S_2O_5$ and 0.8 g of potassium hydroxide. The resulting mixture was allowed to react at 70° C. for 6 hours, and then cooled to room temperature. Thereafter, the pH value of the mixture was adjusted using chlorhydric acid to 6, and then the mixture was allowed to react at 70° C. for 2 hours. After the reaction, the mixture was cooled to room temperature, allowed to stand overnight, filtered, and washed with 10 mL of acetone (3° C.) to yield a white solid, which was dried, and dissolved in 10 mL of anhydrous tetrahydrofuran, and followed by addition of 1.2 g of methacryloyl chloride and 1.5 g of triethylamine. The solution was allowed to react at 0° C. for 24 hours, to yield a cardanol-based polymerizable emulsifier, with a yield of 80%.

2) Preparation of Castor Oil-Based Polyurethane Prepolymer

To a dried four-mouthed flask equipped with a thermometer, agitator, and reflux condenser, 9.32 g of dried castor oil and 10 mL of acetone were added and the temperature thereof was controlled at 10° C. Thereafter, 15 mL of 20 wt. % of acetone dissolved maleic anhydride was added dropwise in 5 min. The mixture was heated to 50° C. and allowed to react for 8 hours, and then was further heated to 75° C. and allowed to react for 4.5 hours. The added solvent was removed under vacuum at 35° C., and the mixture was cooled to room temperature to yield a red-orange maleic anhydride modified castor oil.

9.32 g of the maleic anhydride modified castor oil was heated to 60° C., followed by addition dropwise of 1.9 g of 1,6-diisocyanate, 0.6 g of dibutyltin dilaurate as a catalyst, and 0.08 g of hexamethylene diamine as a chain extendor. The resulting mixture was allowed to react for 5 hours, to yield a viscous polymerizable castor oil-based polyurethane prepolymer.

3) Preparation of Biomass-Based Polymer Emulsion 14.7 g of the castor oil-based polyurethane prepolymer obtained in 2), 0.66 g of the cardanol-based polymerizable emulsifier obtained in 1), 1.6 g of butyl acrylate, and 28 mL of water was mixed and swollen at 55° C. for an hour. The mixture was heated to 80° C., and then an aqueous solution comprising 0.05 g of potassium persulfate was added. Thereafter, the mixture was added to react for 3.5 hours, to yield biomass-based polymer emulsion.

Example 4

1) Preparation of Cardanol-Based Polymerizable Emulsifier 3 g of cardanol purchased from the market was completely dehydrated under vacuum for an hour, and dissolved in 20 mL of a mixed solvent of dioxane and water with a volume ratio thereof of 1:1 at room temperature, followed by addition of 2.5 g of $Na_2S_2O_5$ and 0.5 g of sodium hydroxide. The resulting mixture was allowed to react at 80° C. for 5 hours, and then cooled to room temperature. Thereafter, the pH value of the mixture was adjusted using chlorhydric acid to 1, and then the mixture was allowed to react at 80° C. for an hour. After the reaction, the mixture was cooled to room temperature, allowed to stand overnight, filtered, and washed with 10 mL of acetonitrile (4° C.) to yield a white solid, which was dried, and dissolved in 10 mL of anhydrous dichloromethane, and followed by addition of 1.5 g of methacryloyl chloride and 1.4 g of triethylamine. The solution was allowed to react at 5° C. for 12 hours, to yield a cardanol-based polymerizable emulsifier, with a yield of 80%.

2) Preparation of Castor Oil-Based Polyurethane Prepolymer

To a dried four-mouthed flask equipped with a thermometer, agitator, and reflux condenser, 9.32 g of dried castor oil and 10 mL of acetone were added and the temperature thereof was controlled at 15° C. Thereafter, 10 mL of 30 wt. % of acetone dissolved maleic anhydride was added dropwise in 12 min. The mixture was heated to 40° C. and allowed to react for an hour, and then was further heated to 65° C. and allowed to react for 4 hours. The added solvent was removed under vacuum at 36° C., and the mixture was cooled to room temperature to yield a red-orange maleic anhydride modified castor oil.

10.32 g of the maleic anhydride modified castor oil was heated to 60° C., followed by addition dropwise of 2.22 g of isophorone diisocyanate, 0.4 g of dibutyltin dilaurate as a catalyst, and 0.08 g of diethylenetriamine as a chain extendor. The resulting mixture was allowed to react for 3 hours, to yield a viscous polymerizable castor oil-based polyurethane prepolymer.

3) Preparation of Biomass-Based Polymer Emulsion 14.7 g of the castor oil-based polyurethane prepolymer obtained in 2), 0.5 g of the cardanol-based polymerizable emulsifier obtained in 1), 0.7 g of methylmethacrylate, 1.0 g of butyl acrylate, and 18 mL of water was mixed and swollen at 60° C. for one hour. The mixture was heated to 70° C., and then 1 g of an aqueous solution comprising 0.02 g of ammonium persulfate was added. Thereafter, the mixture was added to react for 3 hours, to yield biomass-based polymer emulsion.

Example 5

1) Preparation of Cardanol-Based Polymerizable Emulsifier 3 g of cardanol purchased from the market was completely dehydrated under vacuum for 3 hours, and dissolved in 20 mL of a mixed solvent of dimethylformamide and water with a volume ratio thereof of 1:1 at room temperature, followed by addition of 1.5 g of $NaHSO_3$ and 0.45 g of sodium hydroxide. The resulting mixture was allowed to react at 150° C. for 3 hours, and then cooled to room temperature. Thereafter, the pH value of the mixture was adjusted using chlorhydric acid to 3, and then the mixture was allowed to react at 150° C. for 3 hours. After the reaction, the mixture was cooled to room temperature, allowed to stand overnight, filtered, and washed with 10 mL of a mixture of alcohol and acetone (0° C., a volume ratio thereof is 1:1) to yield a white solid, which was dried, and dissolved in 10 mL of anhydrous tetrahydrofuran, and followed by addition of 0.72 g of acryloyl chloride and 0.8 g of triethylamine. The solution was allowed to react at 3° C. for 12 hours, to yield a cardanol-based polymerizable emulsifier, with a yield of 80%.

2) Preparation of Castor Oil-Based Polyurethane Prepolymer

To a dried four-mouthed flask equipped with a thermometer, agitator, and reflux condenser, 9.32 g of dried castor oil and 10 mL of acetone were added and the temperature thereof was controlled at 5° C. Thereafter, 15 mL of 20 wt. % of acetone dissolved maleic anhydride was added dropwise in 10 min. The mixture was heated to 30° C. and allowed to react for 0.5 hour, and then was further heated to 60° C. and allowed to react for 4.5 hours. The added solvent was removed under vacuum at 32° C., and the mixture was cooled to room temperature to yield a red-orange maleic anhydride modified castor oil.

10.32 g of the maleic anhydride modified castor oil was heated to 60° C., followed by addition dropwise of 3.1 g of 1,6-diisocyanate, 0.1 g of N,N,N',N'-Tetramethyl-1,4-diaminobutane, 0.15 g of isophoronediamine and 0.1 g of p-phenylenediamine. The resulting mixture was allowed to react for 2 hours, to yield a viscous polymerizable castor oil-based polyurethane prepolymer.

3) Preparation of Biomass-Based Polymer Emulsion 14.7 g of the castor oil-based polyurethane prepolymer obtained in 2), 0.4 g of the cardanol-based polymerizable emulsifier obtained in 1), 2 g of butyl acrylate, and 30 mL of water was mixed and swollen at 50° C. for an hour. The mixture was heated to 75° C., and then 1 g of an aqueous solution comprising 0.05 g of potassium persulfate was added. Thereafter, the mixture was added to react for 2 hours, to yield biomass-based polymer emulsion.

Example 6

1) Preparation of Cardanol-Based Polymerizable Emulsifier 3 g of cardanol purchased from the market was completely dehydrated under vacuum for 1.5 hours, and dissolved in 20 mL of a mixed solvent of dimethyl sulfoxide and water with a volume ratio thereof of 1:1 at room temperature, followed by addition of 2.8 g of $Na_2S_2O_5$ and 0.9 g of potassium hydroxide. The resulting mixture was allowed to react at 90° C. for 2 hours, and then cooled to room temperature. Thereafter, the pH value of the mixture was adjusted using chlorhydric acid to 5, and then the mixture was allowed to react at 80° C. for 3 hours. After the reaction, the mixture was cooled to room temperature, allowed to stand overnight, filtered, and washed with 10 mL of tetrahydrofuran (5° C.) to yield a white solid, which was dried, and dissolved in 10 mL of a mixture of anhydrous acetonitrile and tetrahydrofuran with a volume ratio of 1:1, and followed by addition of 0.8 g of acryloyl chloride and 1.2 g of triethylamine. The solution was allowed to react at 2° C. for 15 hours, to yield a cardanol-based polymerizable emulsifier, with a yield of 80%.

2) Preparation of Castor Oil-Based Polyurethane Prepolymer

To a dried four-mouthed flask equipped with a thermometer, agitator, and reflux condenser, 9.32 g of dried castor oil and 10 mL of acetone were added and the temperature thereof was controlled at 20° C. Thereafter, 10 mL of 30 wt. % of acetone dissolved maleic anhydride was added dropwise in 8 min. The mixture was heated to 25° C. and allowed to react for 20 hours, and then was further heated to 80° C. and allowed to react for 5 hours. The added solvent was removed under vacuum at 30° C., and the mixture was cooled to room temperature to yield a red-orange maleic anhydride modified castor oil.

10.32 g of the maleic anhydride modified castor oil was heated to 60° C., followed by addition dropwise of 2.9 g of 1,6-diisocyaate, 0.1 g of triethylenediamine as a catalyst, and 0.09 g of diethylenetriamine as a chain extendor. The resulting mixture was allowed to react for 3.5 hours, to yield a viscous polymerizable castor oil-based polyurethane prepolymer.

3) Preparation of Biomass-Based Polymer Emulsion 14.7 g of the castor oil-based polyurethane prepolymer obtained in 2), 0.3 g of the cardanol-based polymerizable emulsifier obtained in 1), 1.2 g of butyl acrylate, and 36 mL of water was mixed and swollen at 50° C. for 0.5 hour. The mixture was heated to 85° C., and then 1 g of an aqueous solution comprising 0.06 g of potassium persulfate was added. Thereafter, the mixture was added to react for 4 hours, to yield biomass-based polymer emulsion.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing biomass-based polymer emulsion, the method comprising:
1)
  a) based on mole mass ratio, vacuum dehydrating one part of cardanol for between 1 and 3 hours to be anhydrous, dissolving the cardanol in between 10 and 100 parts of a solvent a, followed by addition of between 0.8 and 1.2 part of a sulphonating agent and between 0.8 and 1.2 part of a strong base;
  b) allowing a resulting mixture to react at a temperature of between 70 and 150° C. for between 2 and 6 hours, cooling the mixture to room temperature, adjusting a pH value thereof using chlorhydric acid to between 1 and 5, allowing the mixture to react at a temperature of between 70 and 150° C. for between 1 and 3 hours, cooling to room temperature, allowing to stand overnight, filtering, washing using between 10 and 100 parts of the solvent a at a temperature of between 0 and 5° C. to yield a white solid;
  c) drying and dissolving the white solid in between 10 and 100 parts of an anhydrous solvent b, followed by addition of between 0.8 and 1.5 part of a modifier and between 0.8 and 1.5 part of triethylamine, allowing a resulting solution to react at a temperature of between 0 and 5° C. for between 0.5 and 24 hours, to yield a cardanol-based polymerizable emulsifier;
2)
  d) based on mole mass ratio, providing one part of dried castor oil with a temperature of between 0 and 20° C., adding dropwise to the castor oil 10-30 wt. % of acetone dissolved maleic anhydride in 5-30 min, heating a resulting mixture to a temperature of between 25 and 50° C. and allowing to react for between 0.5 and 24 hours;
  e) continuing heating the mixture to a temperature of between 60 and 80° C. and allowing to react for between 4 and 5 hours, removing a solvent at a temperature of between 30 and 40° C. under vacuum, cooling the mixture to room temperature, to yield a red-orange maleic anhydride modified castor oil;

f) heating the maleic anhydride modified castor oil to 60° C., followed by addition dropwise of between 1.0 and 2.5 parts of an isocyanate, between 0.1 and 1 part of a catalyst, and between 0.1 and 1 part of a chain extendor, allowing to react for between 1 and 6 hours, to yield a viscous polymerizable castor oil-based polyurethane prepolymer;

3)
g) based on mole mass ratio, mixing one part of the castor oil-based polyurethane prepolymer obtained in 2), between 0.1 and 0.5 part of the cardanol-based polymerizable emulsifier obtained in 1), between 0.5 and 2 parts of an acrylate monomer, and between 5 and 50 parts of water;

h) allowing a resulting solution to swell at a temperature of between 50 and 60° C. for between 0.5 and 2 hours, heating the solution to a temperature of between 70 and 90° C., adding dropwise to the solution an aqueous solution comprising between 0.001 and 0.1 part of an initiator, and allowing the solution to react for between 2 and 4 hours, to yield biomass-based polymer emulsion;

wherein
the strong base is potassium hydroxide and/or sodium hydroxide;
the solvent a is water, alcohol, methanol, tetrahydrofuran, acetone, dioxane, acetonitrile, dimethylformamide, dimethyl sulfoxide, or a mixture thereof;
the solvent b is dichloromethane, tetrahydrofuran, acetonitrile, or a mixture thereof;
the modifier is acryloyl chloride, methacryloyl chloride, allyl chloride, or a mixture thereof;
the sulphonating agent is $Na_2S_2O_5$;
the isocyanate is 1,6-diisocyaate, 1,6-diisocyanate, or isophorone diisocyanate;
the catalyst is N,N,N',N'-Tetramethyl-1,4-diaminobutane, triethylenediamine, dibutyltin dilaurate, or stannous octoate;
the chain extendor is ethylenediamine, diethylenetriamine, hexamethylene diamine, isophoronediamine, p-phenylenediamine, or a mixture thereof;
the acrylate monomer is methylmethacrylate or butyl acrylate; and
the initiator is potassium persulfate, ammonium persulfate, or a mixture thereof.

* * * * *